US012143561B2

(12) United States Patent
Cappello et al.

(10) Patent No.: US 12,143,561 B2
(45) Date of Patent: Nov. 12, 2024

(54) IMAGE GENERATION SYSTEM AND METHOD

(71) Applicant: Sony Interactive Entertainment Inc., Tokyo (JP)

(72) Inventors: Fabio Cappello, London (GB); Maurizio Cerrato, London (GB); Maria Chiara Monti, London (GB); Rosario Leonardi, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 423 days.

(21) Appl. No.: 17/574,007

(22) Filed: Jan. 12, 2022

(65) Prior Publication Data

US 2022/0232201 A1 Jul. 21, 2022

(30) Foreign Application Priority Data

Jan. 19, 2021 (GB) ...................... 2100671

(51) Int. Cl.
| | |
|---|---|
| *H04N 13/344* | (2018.01) |
| *G02B 27/01* | (2006.01) |
| *G02B 27/18* | (2006.01) |
| *H04N 13/363* | (2018.01) |
| *H04N 13/383* | (2018.01) |
| *G06N 20/00* | (2019.01) |

(52) U.S. Cl.
CPC ....... *H04N 13/344* (2018.05); *G02B 27/0172* (2013.01); *G02B 27/18* (2013.01); *H04N 13/363* (2018.05); *H04N 13/383* (2018.05); *G06N 20/00* (2019.01)

(58) Field of Classification Search
CPC .. H04N 13/363; H04N 13/344; H04N 13/383; H04N 13/139; H04N 13/111; G02B 27/0172; G02B 27/18; G06N 20/00; G06T 19/20
See application file for complete search history.

(56) References Cited

U.S. PATENT DOCUMENTS

| | | | |
|---|---|---|---|
| 2012/0223939 A1 | 9/2012 | Noh | |
| 2016/0246061 A1* | 8/2016 | Bickerstaff | ........ G02B 27/0179 |

(Continued)

FOREIGN PATENT DOCUMENTS

EP 4030752 A1 1/2024

OTHER PUBLICATIONS

Extended European Search Report for corresponding EP Application No. 22150359.2, 8 pages, dated Jun. 3, 2022.

(Continued)

*Primary Examiner* — Magda Cruz
(74) *Attorney, Agent, or Firm* — Matthew B. Dernier, Esq.

(57) ABSTRACT

An image generation system comprising an image rendering unit operable to render a first image for display to a first one of a user's eyes, an image obtaining unit operable to obtain a second image for a second one of the user's eyes, the obtained image having been rendered for display at an earlier time, an image reprojection unit operable to reproject the first image from a viewpoint associated with the first one of the user's eyes to a viewpoint associated with the second one of the user's eyes, and an image generation unit operable to generate an output image for the second one of the user's eyes in dependence upon the reprojected first image and the obtained second image.

14 Claims, 8 Drawing Sheets

(56) References Cited

U.S. PATENT DOCUMENTS

2016/0337630 A1* 11/2016 Raghoebardajal .... A63F 13/212
2017/0155885 A1*  6/2017 Selstad ..................... G06T 7/20
2018/0357809 A1   12/2018 Lawless
2020/0257112 A1*  8/2020 Lucas Barcias ... H04N 21/4402
2020/0304769 A1*  9/2020 Bickerstaff ............ G02B 30/34

OTHER PUBLICATIONS

Combined Search and Examination Report for corresponding GB Application No. GB2100671.3, 9 pages, dated Oct. 25, 2021.
Examination Report for corresponding GB Application No. 2100671.3, 2 pages, dated May 3, 2024.

* cited by examiner

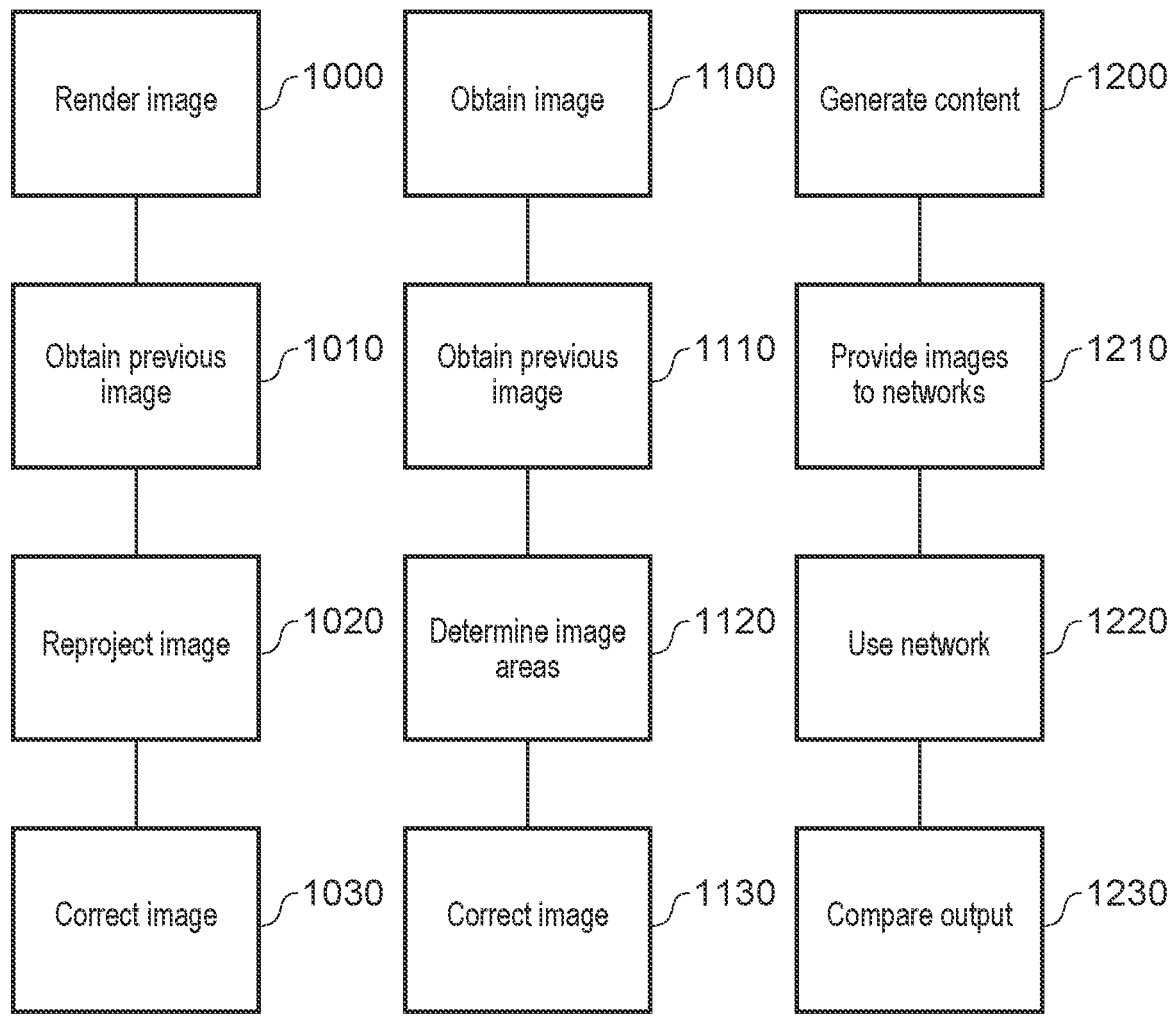

IMAGE GENERATION SYSTEM AND METHOD

BACKGROUND OF THE INVENTION

Field of the Invention

This disclosure relates to an image generation system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The generation of realistic three-dimensional imagery has become of increasing interest in recent years, both with the increasing availability of displays capable of displaying three-dimensional content (such as televisions and cinema screens) and the increasing demand for virtual reality (VR) and augmented reality (AR) content. In many cases, three-dimensional imagery is provided as a stereoscopic image pair—that is, two images are provided that are each provided to a respective one of the viewer's eyes such that when viewed a three-dimensional effect is experienced.

While this is considered desirable in that an enjoyable and immersive three-dimensional video effect is able to be provided, the corresponding image generation process can be particularly intensive given that the number of images to be generated is doubled relative to two-dimensional viewing. In addition to this, it is often considered important to generate three-dimensional content at a high frame rate (so as to aid the immersion of the viewer, by reducing image latency for instance with respect to a change in viewpoint). This further increases the processing requirements, as this can mean that instead of generating thirty frames per second in a two-dimensional example it may be desired that two sets of images are generated at sixty or even one hundred and twenty frames per second—increasing the number of images generated per second by a factor of four or eight respectively.

This increased processing burden may lead to either lower-quality imagery or the provision of fewer-than-desirable frames per second, resulting in a poorer user experience, or an increase in the power (and therefore cost and power consumption) of a device. The latter of these may be a particular concern when considering the generation of imagery using a portable device, as this can lead to both a reduced operation time and discomfort if the device becomes hot during use.

It is therefore desirable that the efficiency of such image generation processes is improved. A number of different processing techniques have been proposed to improve these processes; however these may be limiting in their scope or offer insufficient benefits in view of the desired performance of many three-dimensional video generation implementations. It is in the context of the above discussion that the present invention arises.

SUMMARY OF THE INVENTION

This disclosure is defined by claim 1.

Further respective aspects and features of the disclosure are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 10 schematically illustrates a modified image generation method;

FIG. 11 schematically illustrates a corrective process;

FIG. 12 schematically illustrates a method for training a correction model;

DESCRIPTION OF THE EMBODIMENTS

Figure 1:
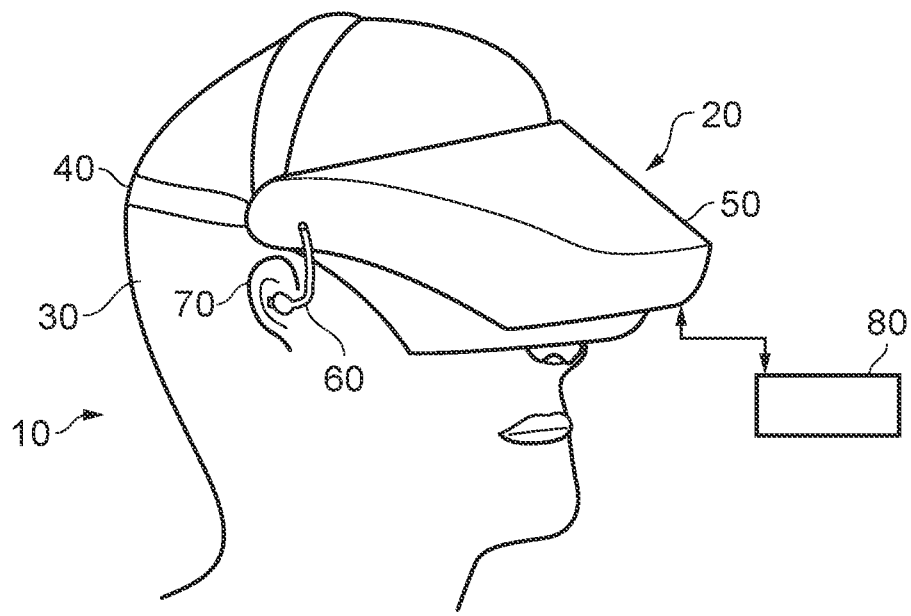
FIG. 1 schematically illustrates an HMD worn by a user.

Referring now to the drawings, wherein like reference numerals designate identical or corresponding parts throughout the several views, embodiments of the present disclosure are described. While the discussion below is focused upon an implementation for use in combination with a head-mountable display unit (HMD), this should not be considered limiting. It should be apparent from consideration of the below description that the discussed techniques may be implemented in any system that utilises stereoscopic image pairs (such as televisions or cinema screens)—the techniques discussed are applicable independent of the display device used to present the images to a viewer. Similarly, the HMD discussed below is a full-immersion HMD that prevents the user from viewing the outside world, but it is considered that in some embodiments a see-through HMD enabling the viewing of AR content may also be appropriate.

In FIG. 1, a user 10 is wearing an HMD 20 (as an example of a generic head-mountable apparatus—other examples including audio headphones or a head-mountable light source) on the user's head 30. The HMD comprises a frame 40, in this example formed of a rear strap and a top strap, and a display portion 50. As noted above, many gaze tracking arrangements may be considered particularly suitable for use in HMD systems; however, use with such an HMD system should not be considered essential.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD, as supplied by an external processing device such as a games console in many embodiments. Of course, in some embodiments images may instead (or additionally) be generated by a processor or obtained from memory located at the HMD itself.

The HMD has associated headphone audio transducers or earpieces 60 which fit into the user's left and right ears 70. The earpieces 60 replay an audio signal provided from an external source, which may be the same as the video signal source which provides the video signal for display to the user's eyes.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. Such images may be used for head tracking purposes, in some embodiments, while it may also be suitable for capturing images for an augmented reality (AR) style experience. A Bluetooth® antenna 124 may provide communication facilities or may simply be arranged as a directional antenna to allow a detection of the direction of a nearby Bluetooth® transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply (including one or more batteries and/or being connectable to a mains power outlet) may be linked by a cable to the HMD. Note that the power supply and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires).

The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the invention are applicable to an HMD having at least one electrical and/or optical cable linking the HMD to another device, such as a power supply and/or a video (and/or audio) signal source. So, embodiments of the invention can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply; or (d) an HMD having a wireless connection to a video and/or audio signal source and a cabled connection to a power supply.

If one or more cables are used, the physical position at which the cable enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160.

The way in which the display element and the optical element(s) cooperate to provide a display to the user will be described with reference to FIG. 3.

Figure 2:
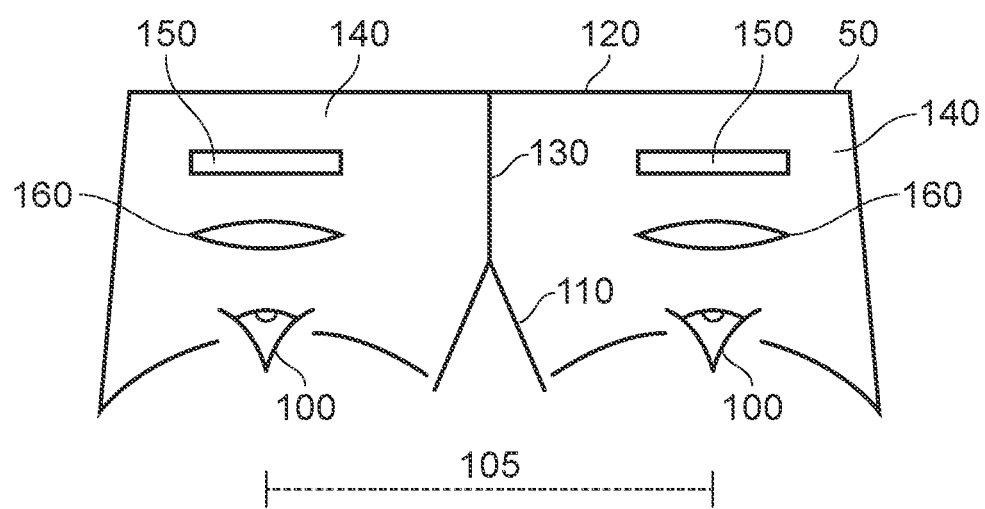
FIG. 2 is a schematic plan view of an HMD.

FIG. 2 also shows the interpupillary distance (IPD) as indicated by the dashed line 105. This distance, often provided in millimetres, indicates the distance between the pupils of the viewer. This can be measured using any suitable imaging device, a measuring tool (such as those used by an optician), or input manually by a user if already known, for instance. While this distance may vary depending upon a depth upon which the user is focused, this can be addressed by providing an object (real or virtual) at a known distance from the user to enable a calibration of this value. In some cases, it may not be necessary to measure the IPD at all, if content is robust to small variations in the IPD such that a single value can be used for a significant number of users.

The IPD may be considered to be useful in a number of embodiments, as it is this value that indicates the difference between the two viewpoints that are used to generate a stereoscopic image pair. That is to say that each of the images in that pair corresponds to a respective one of the user's eyes, and the positions of the respective viewpoints correspond to the positions of the user's eyes. Use of the IPD, whether measured, input, or assumed, can therefore inform the decision of where the respective viewpoints should be defined relative to one another.

Figure 3:
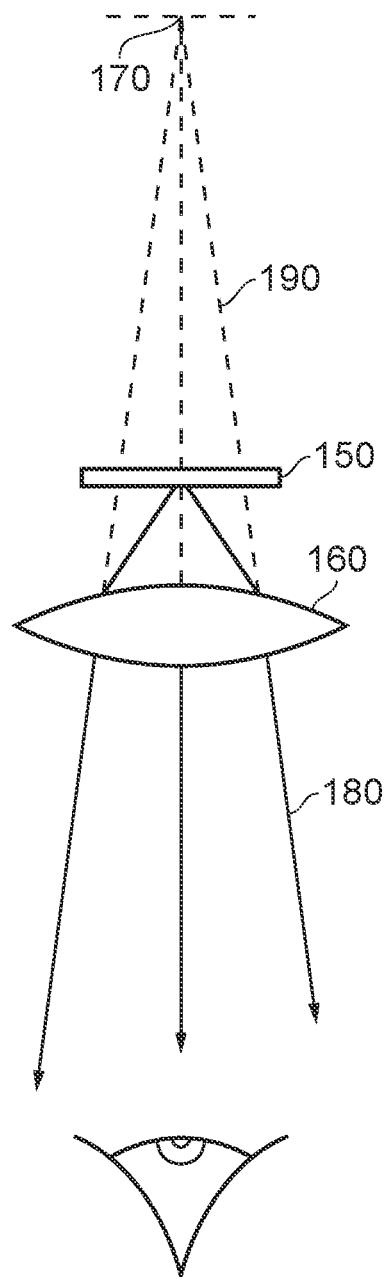
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
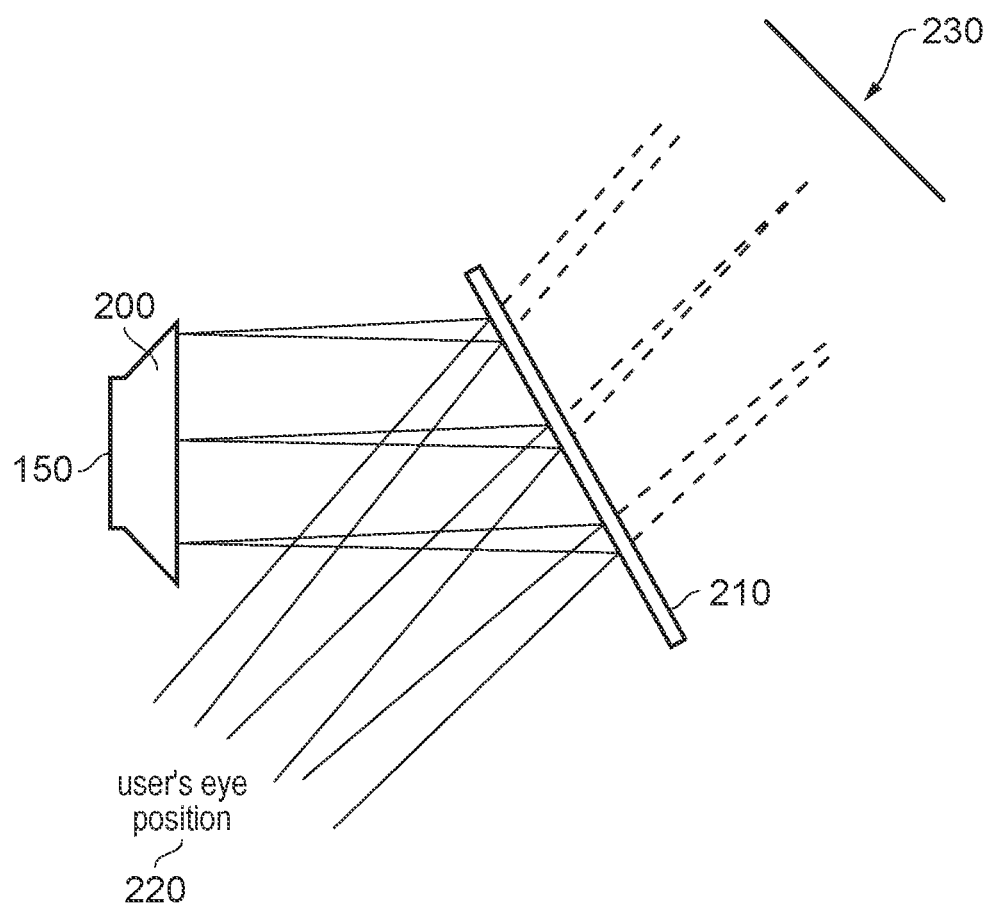
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion. The detection may be performed using any suitable arrangement (or a combination of such arrangements). Examples include the use of hardware motion detectors (such as accelerometers or gyroscopes), external cameras operable to image the HMD, and outwards-facing cameras mounted onto the HMD.

Embodiments of the present disclosure are provided so as to exploit the existence of redundant information in stereoscopic video content. Firstly there is a consideration of the redundancy between the images forming a stereoscopic image pair, and secondly there is a consideration of the redundancy between consecutive image frames for the same viewpoint. By making use of this redundancy, it may be possible to reduce the amount of rendering that is required—offering a number of advantages that may include reduced power consumption, an increased frame rate, and/or a reduced data bandwidth requirement for communications between a processing device and a display device.

Figures 6, 7:
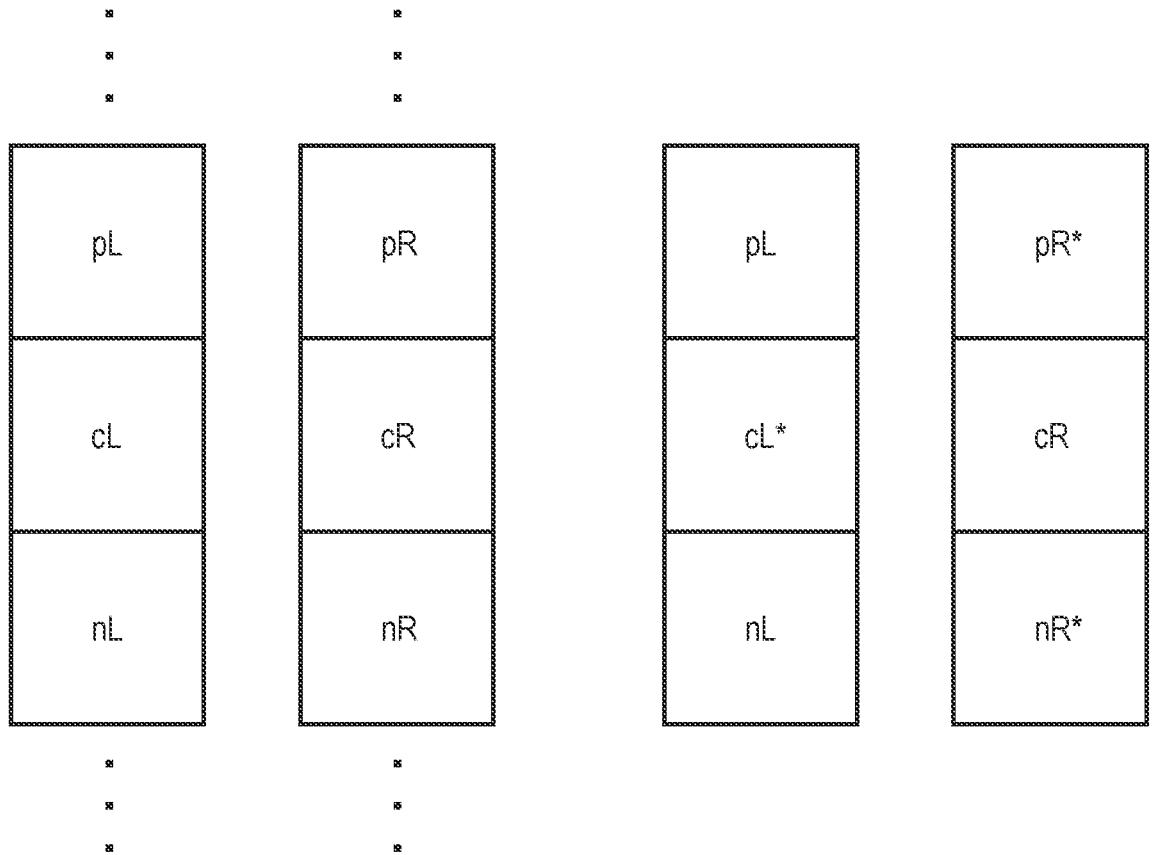
FIG. 6 schematically illustrates image frames corresponding to stereoscopic video.
FIG. 7 schematically illustrates a rendering pattern for image frames corresponding to stereoscopic video.

FIG. 6 schematically illustrates image frames corresponding to stereoscopic video. The left column indicates image frames generated for the left eye, while the right column represents image frames generated for the right eye. Each of the images is denoted by the letter 'L' (for left-eye images) or 'R' (for right-eye images) as appropriate, with a prefix indicating a temporal relationship. The prefix 'p' indicates a previous image, 'c' a current image, and 'n' a next image. In traditional arrangements, each of the images is rendered separately for display to a viewer. This rendering may be based upon head position and/or orientation in some embodiments, although in others (those with a fixed viewpoint) such parameters may not be factored in. Each of the images may be displayed on the corresponding left/right display 150 as shown in FIG. 2, or a single display may be configured to display each image on a respective half of a single display—of course, any other arrangement may also be considered appropriate.

FIG. 7 schematically illustrates image frames corresponding to stereoscopic video as generated using a modified image generation process according to one or more embodiments of the present disclosure. In this Figure the frames marked with an asterisk are not rendered in the traditional manner, but instead generated using an alternative process as discussed below with reference to FIGS. 8 and 9. In this process, alternate frames for each eye are generated with and without using traditional rendering methods. That is to say that one in every two frames for each eye is generated using traditional rendering methods, and the other one of that two is generated using an alternative process. By consistently using rendered images rather than generated images as inputs, a method can be implemented in which image generation errors are not propagated through successive images.

Figure 8:
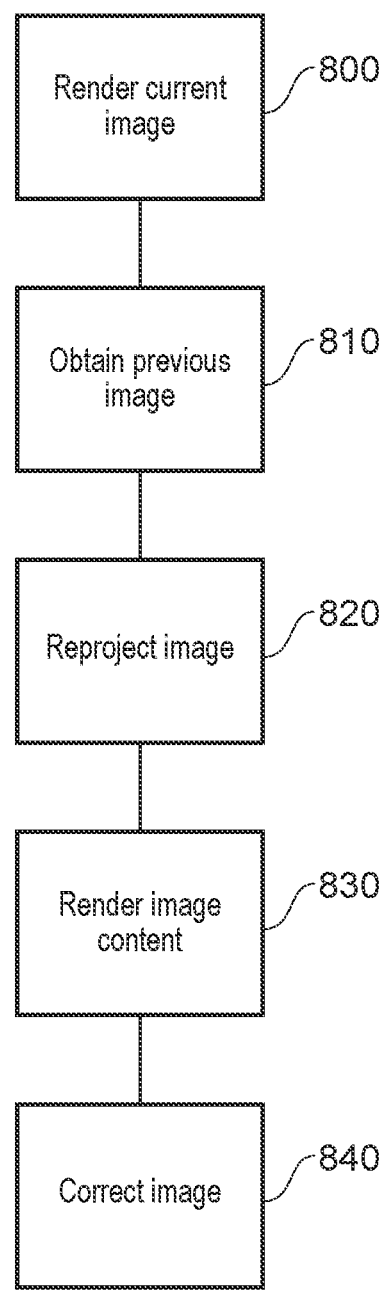
FIG. 8 schematically illustrates a method for generating images.

FIG. 8 schematically illustrates a method for generating images in line with the scheme illustrated in FIG. 7 and discussed above. While the steps are presented in a particular order, it should be appreciated that this order is not considered to be limiting—one or more steps may be modified and the order may be changed where appropriate. For instance, the step of obtaining a previous image may be performed later than the reprojection step without significantly impacting the overall process that is performed. Similarly, if the amount of reprojection is known then the rendering process (step 830) can be performed in advance of, or at least somewhat simultaneously with, the reprojection step 820.

At a step 800, a current image is rendered for display to a user for one eye; for instance, this may be the image cR of FIG. 7. This image may be rendered using any suitable rendering techniques as appropriate, and can have any suitable properties relating to size, resolution, and format (for example). In some cases, the image may be provided with corresponding metadata indicating one or more properties of the image or the scene which is represented by the image. For instance, information about the layout of one or more objects within the scene may be considered useful as a part of the correction process and may form the basis of the metadata in one or more embodiments.

At a step 810, a previous image that was displayed to the other of the user's eyes is obtained. In the context of FIG. 7, this would be the image pL—the most recent image frame generated for the user's left eye. This image need not have been displayed already, as it may instead be queued for display or the like. In some embodiments more than one image may be obtained, such as the last three images or the last five images, as each of these may be images generated from similar viewpoints to that of the image to be generated. These images may be obtained from a buffer or any suitable storage that is configured to store at least a selection of generated image frames.

At a step 820, a geometric reprojection process is performed on the image obtained in the step 800 so as to modify the apparent viewpoint of the image. A geometric reprojection may be implemented in a number of ways, for example using a pixel shift, scaling, and/or rotation of a rendered image to compensate for a modified viewpoint location. The magnitude of the reprojection may be determined in dependence upon an IPD identified for the user, for instance, or based upon another quantity that defines the relationship between the desired viewpoints for the respective left/right images.

At a step 830 a rendering process is performed in which image content is rendered for one or more image areas that do not comprise any image content as a result of the reprojection process in step 830. For instance, when a right-eye image is reprojected to shift the viewpoint to the left-eye position, the left side of the resulting image will be missing as this is where information not available to the right eye would be present. The image content that is rendered is combined with the reprojected image so as to generate a full image—that is, an image that is the same size (or at least substantially the same size) as the current image obtained in step 800 and therefore the correct size for display.

At a step 840, a correction is applied to the image that is generated by combining the reprojected image content (from step 820) and the newly-rendered image content (from step 830). This correction is applied to modify the image so as to account for any view-dependent information that is missing or otherwise incorrect in the image. For instance, reprojection may not generate an accurate representation of each of the objects as seen from the modified viewpoint—for instance, the left eye may be able to see the left side of an object when the right eye cannot.

This correction may be generated in dependence upon both the content of the image itself, and the previous image (or images) rendered for the same viewpoint (as obtained in step 810). While the previous image contains outdated information (as it was generated for display at an earlier time), the image may nevertheless contain more relevant information as the viewpoint for the previous image is likely to be closer for the new image than the rendered image for the other eye. This is particularly true when content is rendered at high frame rates, as the time in which a motion can be performed between frames is limited and therefore the magnitude of that motion is correspondingly limited.

Of course, when generating initial images for display to a user (for example, when initialising a device or at the start of a new scene or the like) the previous image information may be unavailable or of limited relevance. In such a case, the process may default to a more traditional rendering process in which frames are rendered for each eye without reference to other frames (for instance).

Figure 9A:
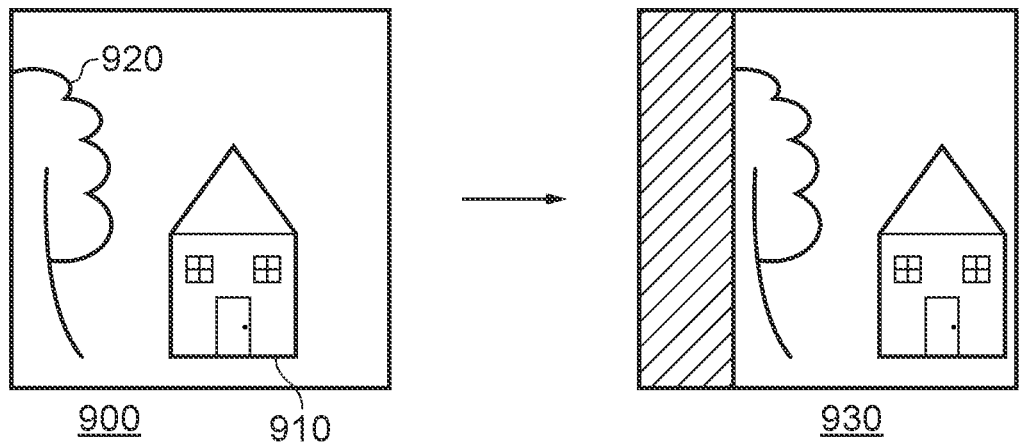
FIGS. 9A to 9C schematically illustrate an implementation of an image generation method.
Figure 9B:
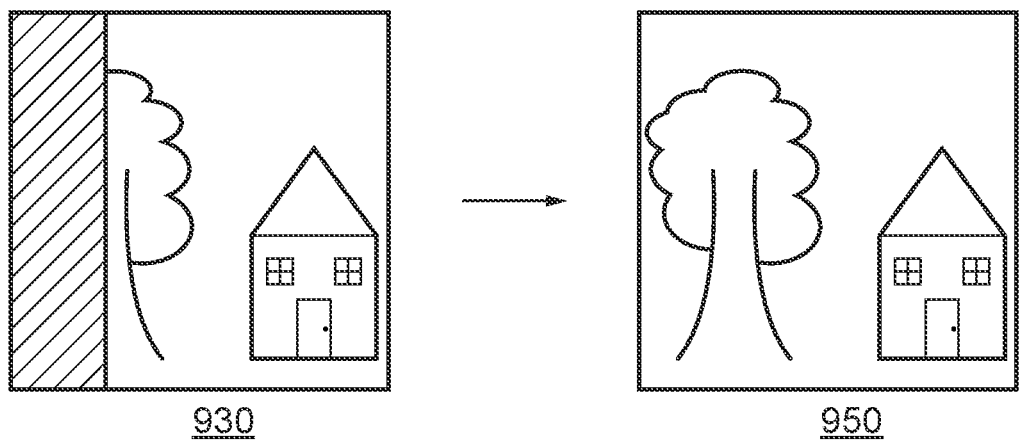
Figure 9C:
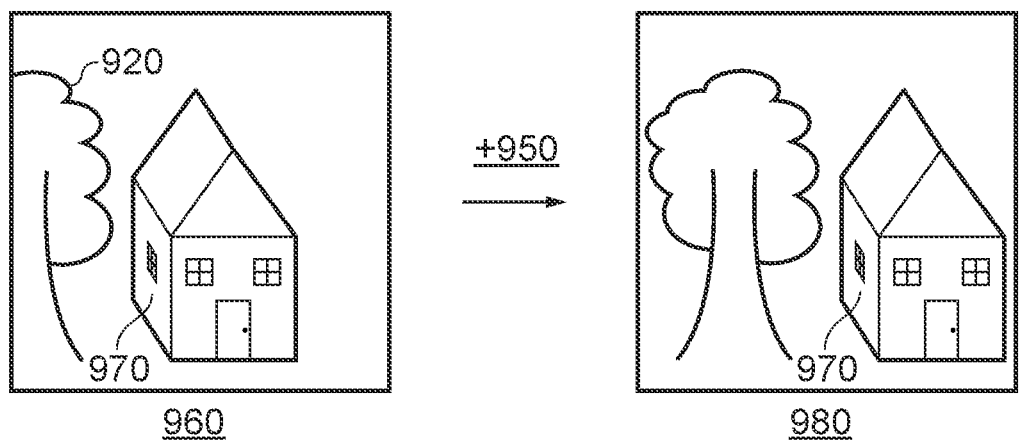

FIGS. 9A to 9C schematically illustrate an implementation of the above method using exemplary images. These exemplary images represent a simplified scene, with an exaggerated difference between the images (for example, by considering the IPD to be larger than in real-world examples) to aid the clarity of the following discussion. In this example, a rendered right-eye image is used to generate a corresponding left-eye image—as noted above, a full implementation of embodiments of the present disclosure utilise alternating generation of right- and left-eye images from the corresponding left- and right-eye rendered images in conjunction with previously rendered images.

FIG. 9A illustrates the step of reprojection of the right-eye image. The right-eye image 900 comprises a house 910 and a portion of a tree 920, each of which is translated to the right within the image frame. This is illustrated by the reprojected right-eye image 930 (which forms the basis of the left-eye image), in which both elements have been moved to the right. An area 940 within the image comprises no image data at this time, as due to the reprojection this corresponds to an image area that exists outside of the right-eye image 900.

FIG. 9B illustrates the step of rendering content to be provided within the missing portion of the reprojected image. As can be seen in the modified image 950, the area 940 now comprises image content (more specifically, the rest of the tree 920). As noted above, this step may not be required in embodiments in which the right-eye image 900 is rendered to be larger than the display size, so as to incorporate additional image content that covers at least the image area 940 in the reprojected image 930.

FIG. 9C illustrates the generation of a final image based upon the output image of FIG. 9B and the previous image for the same eye. In this Figure, the images 950 and 960 are used to generate an output image 980, specifically by adding the image 950 (designated as +950 in FIG. 9C) to the image 960. The image 950 is that generated in FIG. 9B, while the image 960 is a previously rendered image for the left eye (such as the previous image frame); the output image 980 is intended for display to the left eye, although in practice other processing may also be performed if desired (such as an upscaling process, for example, or the addition of overlay elements such as a GUI).

As can be seen in the image 960, the window 970 (and the rest of the side of the house 910) is visible unlike in the right-eye image 900 and the modified image 950. This is an example of information being present in a previous image frame for the same eye that is not present in the current image for the other eye. In some cases, for instance if movement between successive image frames is below a threshold amount, this additional image information can effectively be copied into the output image. In other embodiments, it may be necessary to derive the correct modification to apply to the information to generate content for the output image—for instance, implementing a modified perspective or the like.

FIG. 10 schematically illustrates a modified method that may be implemented as an alternative to that of FIG. 8. In this method, the rendering step 830 of FIG. 8 is effectively performed as a part of the initial rendering step (corresponding to step 800 of FIG. 8). Therefore rather than strictly being an alternative to the method of FIG. 8, this may represent a modification of the order of the steps as discussed above.

A step 1000 comprises the generation of a rendered image for a first one of the user's eyes, with a size larger than the display area that is available to the user. For instance, when generating an image for a 1920×1080 resolution display an image may be rendered that has a resolution of 2100×1200. By providing this additional image data in this rendered image, it may be possible to perform a reprojection without generating an image for the other eye that has a section missing due to a lack of image information.

The distribution of these extra pixels/the additional image area may be determined in any suitable fashion—for instance, a uniform distribution about the image such that a border of pixels that is not to be displayed may be considered appropriate. In some cases, a non-uniform distribution may be used such that a greater number of pixels are provided along one or two edges than the opposite edges of the image (for instance, a right-eye image may be rendered with the bulk of the excess pixels being on the left edge of the generated image). Alternatively, or in addition, the distribution may be informed by predicted or measured user head motion and/or orientation.

A step 1010 comprises obtaining the previously-rendered image for the second one of the user's eyes; this may be the same size as the image generated in the step 1000, or it may be a reduced-size image that corresponds to the portion of the image that was actually displayed to the user. This step broadly corresponds to that of step 810 in FIG. 8, modified as appropriate for managing larger input images if desired.

A step 1020 comprises performing a reprojection of the rendered image for the first one of the user's eyes, as in step 820 of FIG. 8. In this method however, there is no portion of the image which is left blank due to missing image data as any geometric shifts of pixels or the like can be compensated for by the additional image content outside of the display area.

A step 1030 comprises performing a correction of the reprojected image in dependence upon the image obtained in step 1010. This correction corresponds to that discussed above with reference to step 840 of FIG. 8, with further detail of a correction process provided below.

In some embodiments this method may be considered to be preferable, for instance to reduce latency, although it is noted that this process may not be as efficient as the order of steps shown in FIG. 8 as more image content may be generated than is necessary. Such an order of steps may also be beneficial if the rendering process is distributed across multiple devices—for instance, if the rendering of the images takes place at a games console and the generation of the opposite-eye image takes place at a display device such as an HMD then this may reduce the processing burden on the display device.

FIG. 11 schematically illustrates a corrective process that may be used to generate a final image (as illustrated by FIG. 9C). In some embodiments, the corrective process may be implemented using a predefined series of steps or a computer program. Alternatively, the correction may be performed by providing the input images (the approximated image and the previous same-eye image) to a trained machine learning model that is able to produce a corrected image for display.

At a step 1100 an approximation image is obtained; this image represents an estimation of the image content that is to be displayed to one of the user's eyes. This approximation image is the image that is generated at step 830 of FIG. 8, or step 1020 of FIG. 10, for example—that is, an image that is generated for a second one of the user's eyes based upon reprojection of an image generated for the first one of the user's eyes and rendering of additional content not displayed to the first one of the user's eyes.

At a step 1110 the previous image (or a selection of previous images) rendered for the same eye as the obtained approximation image is obtained.

At a step 1120 a determination of image areas requiring correction is performed. This determination may be performed in a number of different ways; for instance, a comparison between the obtained images may be performed so as to identify areas in which there are significant differences (for example, the pixel values differ by more than a threshold amount). Alternatively, or in addition, information about the scene itself may be used as a factor—for instance, depth values (which could be derived from the images themselves by identifying a disparity value or the like, or supplied by a rendering engine) or information about the distribution and/or other properties of the objects within the images may be considered.

At a step 1130 a correction of the approximation image is performed. This correction is at least partially dependent upon the previous image that is obtained in step 1110, as this image is expected to comprise viewpoint-dependent data such as pixels corresponding to occluded surfaces in the other-eye image that forms the basis of the approximation image. This correction comprises the modification of one or more pixel values where appropriate to generate a view of the scene as would be expected from the corresponding viewpoint. An example of this is illustrated in FIG. 9C above, which shows that an image area is modified from being background to being the side of the building.

In embodiments in which a trained machine learning model is used to perform the correction, the training may be performed in any number of suitable ways. An example of such a method is discussed below. The training may be implemented with any desired degree of specificity; a general model can be trained on a range of different images, while a more specific model may be trained for specific content (such as a particular game) or a portion of that content (such as a particular scene, level, or virtual environment).

FIG. 12 schematically illustrates a method for training such a model. This example uses a generative adversarial network (GAN), although other models may also be appropriate for implementing such a method. For instance, a reinforcement learning model may be a suitable alternative with the reinforcement learning agent being rewarded based upon how closely the corrected image corresponds to the ground truth image.

A GAN generally comprises two different networks; a generative network and a discriminative network. The generative network is trained to generate an image output based upon one or more inputs, while the discriminative network is trained to determine whether the generated image output satisfies one or more conditions—in general terms, whether the generated image output is sufficiently close to the input data set so as to be indistinguishable from that data set. In the present case this would mean matching (or at least substantially matching) a particular image in the input data set, or the training of the discriminative network on the rendered images and then using the network to determine whether the generated corrected image is feasibly a rendered image (rather than a corrected one) without reference to the actual rendered image. For instance, this could be performed by comparing the generated image to the rendered image for the other eye and performing an image analysis—such as determining an image disparity or the like to determine whether the images form a suitable stereoscopic image pair.

At a step 1200, video content comprising a plurality of image frames is generated. The generation of video content comprises the rendering of images for both eyes, so as to generate both the inputs for the correction method and the expected image as a ground truth to which the correction method can be compared. At this stage, additional processing may be performed to prepare the images for input to the GAN—for instance, one or more of the plurality of image frames may be subjected to an image reprojection process or the like to more closely align with the expected inputs to a trained model when in use.

A step 1210 comprises providing a selection of the image frames to the respective networks forming the GAN. For instance, a current right-eye image that has been reprojected to the viewpoint of the left eye (and had an additional rendered portion added, in the example of FIG. 8) and a previous left-eye image can be provided to the generative network whilst the discriminative network is provided the current left-eye image and/or the current right-eye image as appropriate for the implemented training method.

A step 1220 comprises using the generative network to perform the correction process using the inputs to generate an output image. The output image is intended to represent the correct output image for the corresponding eye at a given time; that is to say that the output image should resemble the image that would be rendered if a process according to embodiments of the present.

A step 1230 comprises comparing the generated output image to the correct (rendered) image, or to the current image for the other eye, so as to determine a degree of similarity or compatibility as appropriate. This comparison may comprise any suitable image processing techniques, such as the determination of image similarity (if comparing the output image with the rendered image for the same eye and time) or image compatibility as a stereoscopic image pair (if comparing the output image with the rendered image for the other eye and the same time).

This process may be performed iteratively until the output images are considered suitable for display to the user as part of a stereoscopic image pair. This suitability may be determined in any suitable manner, for instance the images showing an equal to or above threshold similarity to the rendered image.

In some embodiments, the model may also be trained to identify cases in which the correction is expected to fail or likely to return poor results, or a separate model may be trained for such a purpose. One such instance is that of when there is a large object close to one of the viewpoints (that is, close to the user's eye in the virtual environment), such as if the user (or virtual equivalent) holds their hand to their face. In such a case, the images generated for that eye would be almost entirely occupied by the user's hand—and therefore would not comprise useful information for generating an image for the other eye which is not obscured in the same manner. When conditions for failure are identified, which may be based upon image properties or information about the scene provided separately, the correction process may be abandoned in favour of a traditional rendering process or the like. An example of conditions for failure may be based upon a comparison of depth information for each eye; if the depth for a number of pixels differs by at least a threshold amount then it may be considered that the pixels do not correspond to the same object for each eye. Similarly, the luminance of corresponding pixels can be compared to identify if there is a significant difference.

Figure 13:
FIG. 13 schematically illustrates an image generation system.

FIG. 13 schematically illustrates an image generation system comprising an image rendering unit 1300, an image obtaining unit 1310, an image reprojection unit 1320, an image analysis unit 1330, and an image generation unit 1340.

In a number of embodiments, at least the image rendering unit is located at a first device, and at least the image generation unit is located at a second device. For instance, the first device may be a video game console or a computer while the second device is a head-mountable display. Alternatively, the first device may be a cloud computing arrangement (such as one or more servers) while the second is a games console, head-mountable display, mobile phone, or other processing device associated with a display. Of course, other arrangements of the units described with reference to FIG. 13 may also be considered—in a number of embodiments all of the units may be located in the same hardware device for example.

The image rendering unit 1300 is operable to render a first image for display to a first one of a user's eyes. In some embodiments, the image rendering unit 1300 may be operable to render a first image that is larger than the intended display size; in other words, only a portion of the rendered image may actually be displayed to the first one of the user's eyes. Alternatively, or in addition, the image rendering unit 1300 may be operable to render one or more image portions corresponding to missing image areas in the reprojected image. In some embodiments, the image rendering unit 1300 may instead function as an image obtaining unit that obtains the first image for display to a first one of a user's eyes as rendered by another device at an earlier time. In other words, it is not required that the rendered image be rendered as a part of the system described here.

The image obtaining unit 1310 is operable to obtain a second image for a second one of the user's eyes, the obtained image having been rendered for display at an earlier time. This obtained image may be a previous image frame within a video, for example a preceding image frame as discussed above with reference to FIG. 7. This image may be obtained from any suitable source—for instance, a local storage device, a removable storage medium, or another computing device or server via a network. In some embodiments, the image may be retrieved from a local image buffer.

The image reprojection unit 1320 is operable to reproject the first image from a viewpoint associated with the first one of the user's eyes to a viewpoint associated with the second one of the user's eyes. An example of this process is discussed above with reference to FIG. 9A.

The image analysis unit 1330 is an optional unit that is operable to identify one or more portions of the rendered image for the first one of the user's eyes for which a standard rendering process should be used to generate corresponding portions of the output image. This additional rendering may be performed by the image rendering unit 1300 and/or the image generation unit 1340 as appropriate for the portion being rendered.

In some embodiments, the one or more portions are portions that are only able to be seen from a viewpoint corresponding to a single one of the user's eyes. This can include portions such as those shown in FIG. 9A above (that is, portions that are not present in the first image), or portions corresponding to occluded areas in a first image—an example of this is discussed above with reference to a user holding their hand to their face. This first example is in line with the process discussed with respect to FIG. 9B above. If the image rendering unit 1300 renders a first image that is larger than the display size then it may not be necessary to perform such a rendering process in respect of generating content to fill in gaps left by the reprojection; such rendering should therefore not be considered to be essential.

Alternatively, or in addition, the one or more portions are objects that are identified as having an equal to or above threshold motion, complexity, or rotation—such objects may exhibit significant changes between image frames, and as such the use of past information may not be particularly suitable. Parts of the image with a below-threshold image depth may be considered appropriate for image generation rather than re-use, whereas image portions (such as a backdrop) may be considered to be more reusable as the depth means that changes between frames are likely to be reduced.

The image generation unit 1340 is operable to generate an output image for the second one of the user's eyes in dependence upon the reprojected first image and the obtained second image. In a number of embodiments, the image generation unit 1340 is operable to utilise a trained machine learning model to generate the output image. The machine learning model may be trained for a particular interactive game or interactive video content, or a portion thereof (such as a specific stage, environment, or scene). The first image and the output image may be output for simultaneous display at a head-mountable display device or other display device, or alternatively may be streamed to another device or stored for later use (for example as a stereoscopic image stream).

As discussed above with reference to FIG. 7, in a number of embodiments the image generation system is configured to generate a first image for the first one of the user's eyes at a first time, and a second image for the second one of the user's eyes at a second time. In some embodiments, the first image and the second image are successive image frames for display as a part of a video content; however, in other embodiments it may be considered suitable that a group of two or more images for the first one of the user's eyes are generated before generating a group of two or more images for the second one of the user's eyes.

The arrangement of FIG. 13 is an example of a processor (for example, a GPU and/or CPU located in a games console or any other computing device) that is operable to generate image content, and in particular is operable to:

render a first image for display to a first one of a user's eyes;

obtain a second image for a second one of the user's eyes, the obtained image having been rendered for display at an earlier time;

reproject the first image from a viewpoint associated with the first one of the user's eyes to a viewpoint associated with the second one of the user's eyes; and generate an output image for the second one of the user's eyes in dependence upon the reprojected first image and the obtained second image.

Figure 14:
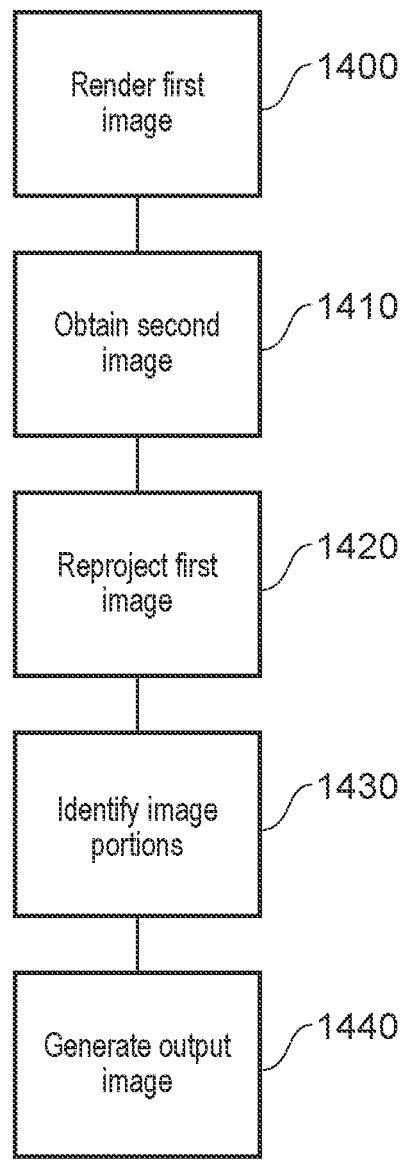
FIG. 14 schematically illustrates an image generation method.

FIG. 14 schematically illustrates an image generation method.

A step 1400 comprises rendering a first image for display to a first one of a user's eyes.

A step 1410 comprises obtaining a second image for a second one of the user's eyes, the obtained image having been rendered for display at an earlier time.

A step 1420 comprises reprojecting the first image from a viewpoint associated with the first one of the user's eyes to a viewpoint associated with the second one of the user's eyes.

An optional step 1430 comprises identify one or more portions of the rendered image for the first one of the user's eyes for which a standard rendering process should be used to generate corresponding portions of the output image.

A step 1440 comprises generating an output image for the second one of the user's eyes in dependence upon the reprojected first image and the obtained second image.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the present disclosure may be configured in accordance with one or more of the following numbered clauses:

1. An image generation system comprising:
    an image rendering unit operable to render a first image for display to a first one of a user's eyes;
    an image obtaining unit operable to obtain a second image for a second one of the user's eyes, the obtained image having been rendered for display at an earlier time;
    an image reprojection unit operable to reproject the first image from a viewpoint associated with the first one of the user's eyes to a viewpoint associated with the second one of the user's eyes; and
    an image generation unit operable to generate an output image for the second one of the user's eyes in dependence upon the reprojected first image and the obtained second image.
2. A system according to clause 1, wherein the image rendering unit is operable to render one or more image portions corresponding to missing image areas in the reprojected image.
3. A system according to any preceding clause, wherein the image generation system is configured to generate a first image for the first one of the user's eyes at a first time, and a second image for the second one of the user's eyes at a second time.
4. A system according to clause 3, wherein the first image and the second image are successive image frames for display as a part of a video content.
5. A system according to clause 3, wherein a group of two or more images for the first one of the user's eyes are generated before generating a group of two or more images for the second one of the user's eyes.
6. A system according to any preceding clause, comprising an image analysis unit operable to identify one or more portions of the rendered image for the first one of the user's eyes for which a standard rendering process should be used to generate corresponding portions of the output image.
7. A system according to clause 6, wherein the one or more portions are objects that are identified as having an equal to or above threshold motion, complexity, or rotation.
8. A system according to clause 6, wherein the one or more portions are portions that are only able to be seen from a viewpoint corresponding to a single one of the user's eyes.
9. A system according to any preceding clause, wherein the image generation unit is operable to utilise a trained machine learning model to generate the output image.
10. A system according to clause 9, wherein the machine learning model is trained for a particular interactive game or interactive video content, or a portion thereof.
11. A system according to any preceding clause, wherein at least the image rendering unit is located at a first device and at least the image generation unit is located at a second device.
12. A system according to any preceding clause, wherein the first image and the output image are output for simultaneous display at a head-mountable display device.

The invention claimed is:

1. An image generation system comprising:
    an image rendering unit operable to render a first image for display to a first one of a user's eyes;
    an image obtaining unit operable to obtain a second image for a second one of the user's eyes, the obtained image having been rendered for display at an earlier time;
    an image reprojection unit operable to reproject the first image from a viewpoint associated with the first one of the user's eyes to a viewpoint associated with the second one of the user's eyes; and
    an image generation unit operable to generate an output image for the second one of the user's eyes in dependence upon the reprojected first image and the obtained second image.
2. The system of claim 1, wherein the image rendering unit is operable to render one or more image portions corresponding to missing image areas in the reprojected image.
3. The system of claim 1, wherein the image generation system is configured to generate a first image for the first one of the user's eyes at a first time, and a second image for the second one of the user's eyes at a second time.
4. The system of claim 3, wherein the first image and the second image are successive image frames for display as a part of a video content.
5. The system of claim 3, wherein a group of two or more images for the first one of the user's eyes are generated before generating a group of two or more images for the second one of the user's eyes.
6. The system of claim 1, comprising an image analysis unit operable to identify one or more portions of the rendered image for the first one of the user's eyes for which a standard rendering process should be used to generate corresponding portions of the output image.
7. The system of claim 6, wherein the one or more portions are objects that are identified as having an equal to or above threshold motion, complexity, or rotation.
8. The system of claim 6, wherein the one or more portions are portions that are only able to be seen from a viewpoint corresponding to a single one of the user's eyes.
9. The system of claim 1, wherein the image generation unit is operable to utilise a trained machine learning model to generate the output image.
10. The system of claim 9, wherein the machine learning model is trained for a particular interactive game or interactive video content, or a portion thereof.
11. The system of claim 1, wherein at least the image rendering unit is located at a first device and at least the image generation unit is located at a second device.
12. The system of claim 1, wherein the first image and the output image are output for simultaneous display at a head-mountable display device.
13. An image generation method comprising:
    rendering a first image for display to a first one of a user's eyes;
    obtaining a second image for a second one of the user's eyes, the obtained image having been rendered for display at an earlier time;
    reprojecting the first image from a viewpoint associated with the first one of the user's eyes to a viewpoint associated with the second one of the user's eyes; and
    generating an output image for the second one of the user's eyes in dependence upon the reprojected first image and the obtained second image.
14. A non-transitory machine-readable storage medium which stores computer software which, when executed by a computer, causes the computer to perform an image generation method comprising the steps of:

rendering a first image for display to a first one of a user's eyes;

obtaining a second image for a second one of the user's eyes, the obtained image having been rendered for display at an earlier time;

reprojecting the first image from a viewpoint associated with the first one of the user's eyes to a viewpoint associated with the second one of the user's eyes; and generating an output image for the second one of the user's eyes in dependence upon the reprojected first image and the obtained second image.

\* \* \* \* \*